(12) United States Patent
Parrow et al.

(10) Patent No.: US 6,543,722 B1
(45) Date of Patent: Apr. 8, 2003

(54) CHILD RESTRAINT SYSTEM FOR AIRCRAFT USE

(75) Inventors: James John Parrow, Coppell, TX (US); Ronald John Nathan, Long Beach, CA (US); David Joseph Duda, Corona, CA (US)

(73) Assignee: Golden Talon Aviation Consulting, Inc., Coppell, TX (US)

( * ) Notice: Subject to any disclaimer, the term of this patent is extended or adjusted under 35 U.S.C. 154(b) by 0 days.

(21) Appl. No.: 09/938,975

(22) Filed: Aug. 24, 2001

(51) Int. Cl.$^7$ .......................... B60R 21/00; B64D 10/00
(52) U.S. Cl. .................. 244/122 R; 297/485; 297/464; 297/216.2
(58) Field of Search .................. 244/122 R, 118.5, 244/118.6; 297/464–488, 216.11, 219.12, 250.1, 251–256, 256.11–256.17

(56) References Cited

U.S. PATENT DOCUMENTS

| | | | | |
|---|---|---|---|---|
| 3,331,633 A | * | 7/1967 | Kovacevich | 297/219.12 |
| 3,404,917 A | * | 10/1968 | Smith | 297/219.12 |
| 3,865,433 A | * | 2/1975 | Stafford | 297/390 |
| 4,067,608 A | * | 1/1978 | Von Wimmersperg | 297/219.12 |
| 4,429,916 A | * | 2/1984 | Hyde et al. | 297/250 |
| 4,618,186 A | * | 10/1986 | Swanson | 297/468 |
| 4,674,800 A | * | 6/1987 | Ensign | 297/456 |
| 5,080,441 A | * | 1/1992 | Stevenson et al. | 297/488 |
| 5,118,163 A | * | 6/1992 | Brittian et al. | 297/250 |
| 5,265,828 A | * | 11/1993 | Bennington | 244/122 R |
| 5,328,249 A | * | 7/1994 | Ball | 297/483 |
| 5,332,285 A | * | 7/1994 | Sinnhuber | 297/250.1 |
| 5,536,066 A | * | 7/1996 | Sedlack | 297/250.1 |
| 5,540,403 A | * | 7/1996 | Standley | 244/122 R |
| 5,624,135 A | * | 4/1997 | Symonds | 280/801.1 |
| 5,713,630 A | * | 2/1998 | Kvalvik | 297/254 |
| 5,749,599 A | * | 5/1998 | Gardner | 280/748 |
| 5,775,772 A | * | 7/1998 | Lefranc | 297/250.1 |
| 5,810,435 A | * | 9/1998 | Surot | 297/250.1 |
| 5,820,215 A | * | 10/1998 | Dreisbach | 297/256.16 |
| 5,895,092 A | * | 4/1999 | Fishcer | 297/256.15 |
| 6,048,028 A | * | 4/2000 | Bapst | 297/250.1 |
| 6,237,999 B1 | * | 5/2001 | Hobson | 297/256.15 |
| 6,193,310 B1 | * | 2/2002 | Batalaris et al. | 297/253 |
| 6,296,307 B1 | * | 10/2002 | Holtke | 297/219.12 |
| 6,471,298 B2 | * | 10/2002 | Carine et al. | 297/483 |
| 2001/0013719 A1 | * | 8/2001 | Carine et al. | 297/484 |
| 2002/0079734 A1 | * | 6/2002 | Murphy et al. | 297/483 |
| 2002/0113470 A1 | * | 8/2002 | Kain | 297/256.16 |

* cited by examiner

Primary Examiner—Michael J. Carone
Assistant Examiner—Stephen A Holzen
(74) Attorney, Agent, or Firm—John G. Fischer, Esq.; Storm & Hemingway LLP

(57) ABSTRACT

A child safety restraint system is disclosed for use on private and commercial aircraft. The invention includes a removable, portable strap assembly for safely securing automotive child safety seats to aircraft seats and frames in compliance with present and pending federal aviation safety regulations. A system is disclosed which includes a pair of anchors attached to the front beam on an aircraft seat. A pair of connectable and adjustable belt assemblies are attached one each, to the anchors. One belt assembly is passed through the frame of a child safety seat and connected to the other belt assembly. The combined length of the connected belt assemblies is then adjusted to place the system in tension, and thereby secure the child safety seat to the aircraft seat. The resulting system provides significantly improved safety for children over the use of the lap belts to secure child safety seats in commercial aircraft.

29 Claims, 11 Drawing Sheets

CHILD RESTRAINT SYSTEM FOR AIRCRAFT USE

CROSS-REFERENCE TO RELATED APPLICATION

None.

BACKGROUND OF THE INVENTION

1. Technical Field

The present invention relates to child safety restraint systems in transportation, and in particular, to child restraint systems for use on aircraft. More specifically, the present invention relates to a removable, portable strap assembly for securing automotive child safety seats to aircraft seats and frames in compliance with federal aviation safety regulations.

2. Description of Related Art

The safe transportation of children is an issue of national interest. Every state in the nation has enacted laws pertaining to the use of child safety seats in vehicles for the transportation of infants and toddlers under 2 years of age. Substantial progress has been made in the design of these seats and education of the public in the necessity of their use. Airline transportation has provided safety engineers with different problems to address than automobiles. Additionally, since travel by infants and toddlers on aircraft is less frequent than by automobile, design improvements have lagged. Since parents traveling with infants and toddlers are required to have child car safety seats at their final destinations, the safety seats normally travel with the parents, but often are stored as luggage, with the children being held by the parents or secured into an aircraft seat with a standard lap belt. The small bodies of children are not well protected by a lap belt, and are at extreme risk when being held by a parent or guardian. Infants held by a parent or guardian also pose a serious risk to other passengers and crewmembers, since the adult is unable to hold onto the child in severe turbulence, high energy stops, and crashes. The result is that infants and toddlers on aircraft are currently at much higher risk of injury or death than adults.

Presently, a number of child car seat designs are commercially available. These include, but are not limited to:

1. Rear-facing Infant Seats with and without removable bases (birth to 20 lbs.)
2. Convertible Seats, Rearward Facing Position (birth to 20 lbs.)
3. Convertible Seats, Forward Facing Position (20 to 40 lbs.)
4. Forward Facing Only Seats (20 to 60 lbs.)
5. High-Back Booster Seats with Built-in Harness (30 to 40 lbs. when used with harness).
6. Belt Positioning Booster Seats (40 to 80 lbs.)

The weight descriptions are used for general identification purposes only. The foregoing description is not intended to be instructive as to the use or safety of any car seat. Weight recommendations are usually combined with height recommendations and these numbers vary substantially from model to model. The manufacturers' recommendations for the individual car seat design should be consulted and followed. Forward facing child safety seats (not including booster seats) now include a top tether strap to provide additional protection to the child's head. This is part of the "Lower Anchors and Tethers for Children (LATCH) System," which is also intended to make installation of child safety seats easier by requiring child safety seats to be installed without using the vehicle's seat belt system. This adjustable tether strap is attached to the back of a child safety seat, and has a hook for securing the seat to a tether anchor located on the rear shelf area, the rear floor, or on the back of the rear seat of the vehicle.

Aircraft operators currently permit the use of existing aircraft restraint belts in combination with (#1) Rear-facing Infant Seats and (#2) Convertible Seats, Rearward Facing Position. However, the use of existing aircraft restraint belts in combination with (#3) Convertible Seats, Forward Facing Position, (#4) Forward Facing Only Seats, and (#5) High-Back Booster Seats with Built-in Harness, fails to provide adequate safety for children in a survivable crash situation. The use of (#6) Belt Positioning Booster Seats is prohibited.

The Federal Aviation Administration (FAA) currently accepts the use of automobile safety seats that meet the specific requirements of Federal Motor Vehicle Safety Standard (FMVSS) §213 as required by Federal Aviation Regulation (FAR) §121.311.

Public and governmental awareness of the continuing safety issues related to children traveling by plane has increased dramatically in recent years. On May 16, 1995, the National Transportation Safety Board issued Safety Recommendation A-95-51 recommending revision of 14 Code of Federal Regulation (CFR) Parts 91, 135, and 121 to require that all occupants be restrained during take-off, landing, and turbulent conditions, and that all infants and small children be restrained in a manner appropriate to their size.

On Feb. 11, 1998, the FAA issued an Advanced Notice of Proposed Rulemaking (ANPRM) seeking comments, data, and analysis regarding the use of existing child restraint systems during all phases of flight. The FAA is now developing a Notice of Proposed Rulemaking (NPRM) to require that all occupants (including infants and children) be properly restrained during take-off, landing, and turbulent conditions, when the seatbelt sign is illuminated and when instructed by a crewmember. Pending revisions to FAR §121.311 and new regulations under development, are intended to provide infants and toddlers an "equivalent level of safety" to that of the adult passengers by utilization of child safety seats secured to aircraft seats in a manner that meets the dynamic test requirements of FAR §25.562.

The use of existing forward facing child safety seats, secured by an aircraft lap belt, will not achieve the requirements of the new and revised Federal Aviation Regulations. The inventors have recognized that one reason for this failure is that when tension is applied to existing seat belts, they pull downward on the child safety seat. This allows a forward facing child seat to pitch, or rotate forward in the event of a crash. When this occurs, infants experience excessive head acceleration and possible collision with the seat backs of the seats in the adjacent row. The problem results from the relatively low and forwardly located position of the attach shackle of aircraft lap belts. The present invention corrects this problem with a simple, inexpensive, removable system that can be retrofitted to the great majority of the hundreds of thousands of commercial aircraft seats currently in use.

The concept of designing "aircraft only" child seats has a number of disadvantages. One disadvantage is that it would increase travel cost. Another disadvantage is that use of aircraft only safety seats becomes substantially inconvenient for travelers and airlines. Families would have to bring two child safety seats with them for every child. Alternatively, airlines would be forced to inventory numerous heavy, expensive, and bulky "aircraft only" safety seats. Another disadvantage is that this would increase the weight of the cargo of the aircraft, since parents would be traveling with the automotive safety seat anyway.

The option of dedicating a limited number of selected seats with integral safety seats to children has similar problems. One disadvantage is that such designs are not easily removable or portable, and would thus limit the seating arrangements between parents and children, since the number and spatial arrangement cannot accommodate the variable number of family members. Another disadvantage of these devices is that they are higher in weight. Another disadvantage of these devices is that they are expensive. Another disadvantage of these devices is that they pose additional sanitation issues.

It can thus be seen that there is a need to develop a design for securing automotive safety seats securely into aircraft seats in a manner that provides infants and toddlers at least an equivalent degree of safety as is provided to adults. There is also a need to design a system that meets or exceeds the requirements of the Federal Aviation Regulations. There is also a need to design a system that is removable, portable, and light-weight, and not bulky to store. There is also a need to design a system that can accommodate the various aircraft seat designs. There is also a need to design a system that is inexpensive and convenient to use. There is also a need to design a system that can utilize car safety seats in securing infants and toddlers safely in aircraft seats.

BRIEF SUMMARY OF THE INVENTION

A primary advantage of the present invention is that it provides infants and toddlers a degree of safety that is at least equivalent to that currently provided to adult passengers. Another advantage of the present invention is that it exceeds all current and pending Federal Aviation Regulations. Another advantage of the present invention is that it is removable, portable, and light-weight, and not bulky to store. Another advantage of the present invention is that it can accommodate the various aircraft seat designs. Another advantage of the present invention is that it can accommodate both forward and aft facing orientations of children. Another advantage of the present invention is that it is simple and inexpensive to manufacture. Another advantage of the present invention is that it is easy to install. Another advantage of the present invention is that it can utilize FMVSS §213 approved car safety seats to secure infants and toddlers safely to aircraft seats. Another advantage of the present invention is that it does not interfere with evacuations, passenger comfort, tray table use, seat back pocket and safety information card access, or carry-on luggage storage. Other advantages of the present invention will become apparent from the following descriptions, taken in connection with the accompanying drawings, wherein, by way of illustration and example, an embodiment of the present invention is disclosed.

In the preferred embodiment of the present invention, an aircraft child restraint system is disclosed comprising a pair of anchors having a beam connector on one end and a belt connector on the opposite end. The beam connectors are connectable to the forward seat beam of an aircraft seat. A first belt assembly has a latch plate on one end, and a clip on the opposite end. The clip removably attaches the first belt assembly to the belt connector of one of the anchors. A second belt assembly has a releasable buckle on one end, and a clip on the opposite end. In the preferred embodiment, the second belt assembly includes a second belt adjustment assembly located between the ends of the assembly. The clip removably attaches the second belt assembly to the belt connector of the other anchor. The latch plate is quick-connectable to the buckle.

In another embodiment, zip-ties are used to secure the anchors to the rear seat beam of an aircraft seat. In another embodiment, a first belt adjuster movably connects the latch plate to the belt. In another embodiment, the first and second belt assemblies are constructed of polyester webbing. In another embodiment, a webbing guard is located on at least one belt assembly. In another embodiment, the webbing guard is imprinted to identify the preferred position of the belt assembly as "window-side" or "aisle-side." In another embodiment, an adjuster pad is located on the second belt assembly. In another embodiment, the anchors are made of wire rope. In another embodiment, the wire rope is 7×19⅛" stainless steel cable. In another embodiment, the beam connector is a loop formed at the end of the wire rope and a rope grip for securing the loop. In another embodiment, a protective shrink-wrap is applied to at least a portion of the wire rope. In another embodiment, the shrink-wrap is color-coded to assist in location of the anchor. In another embodiment, the belt connector comprises a thimble located at the end of the wire rope, with a loop formed by the wire rope around the thimble, and a loop sleeve securing the loop around the thimble. In another embodiment, the clip is a snap hook attached to the belt assembly.

In an alternative embodiment, an aircraft child restraint system comprises a first belt assembly having a latch plate on one end and a beam connector on the opposite end. A second belt assembly has a releasable buckle on one end, a beam connector on the opposite end, and a second belt adjuster located between the buckle and clip. Each beam connector is removably connectable to the forward seat beam of an aircraft seat. The latch plate is quick-connectable to the buckle.

In an alternative embodiment, an aircraft child restraint system comprises a first belt assembly having a latch plate on one end and a beam connector on the opposite end. A second belt assembly has a releasable buckle on one end, a beam connector on the opposite end, and a second belt adjuster located between the buckle and clip. Each beam connector is removably connectable to the aft seat beam of an aircraft seat. The latch plate is quick-connectable to the buckle.

BRIEF DESCRIPTION OF THE SEVERAL VIEWS OF THE DRAWING(S)

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
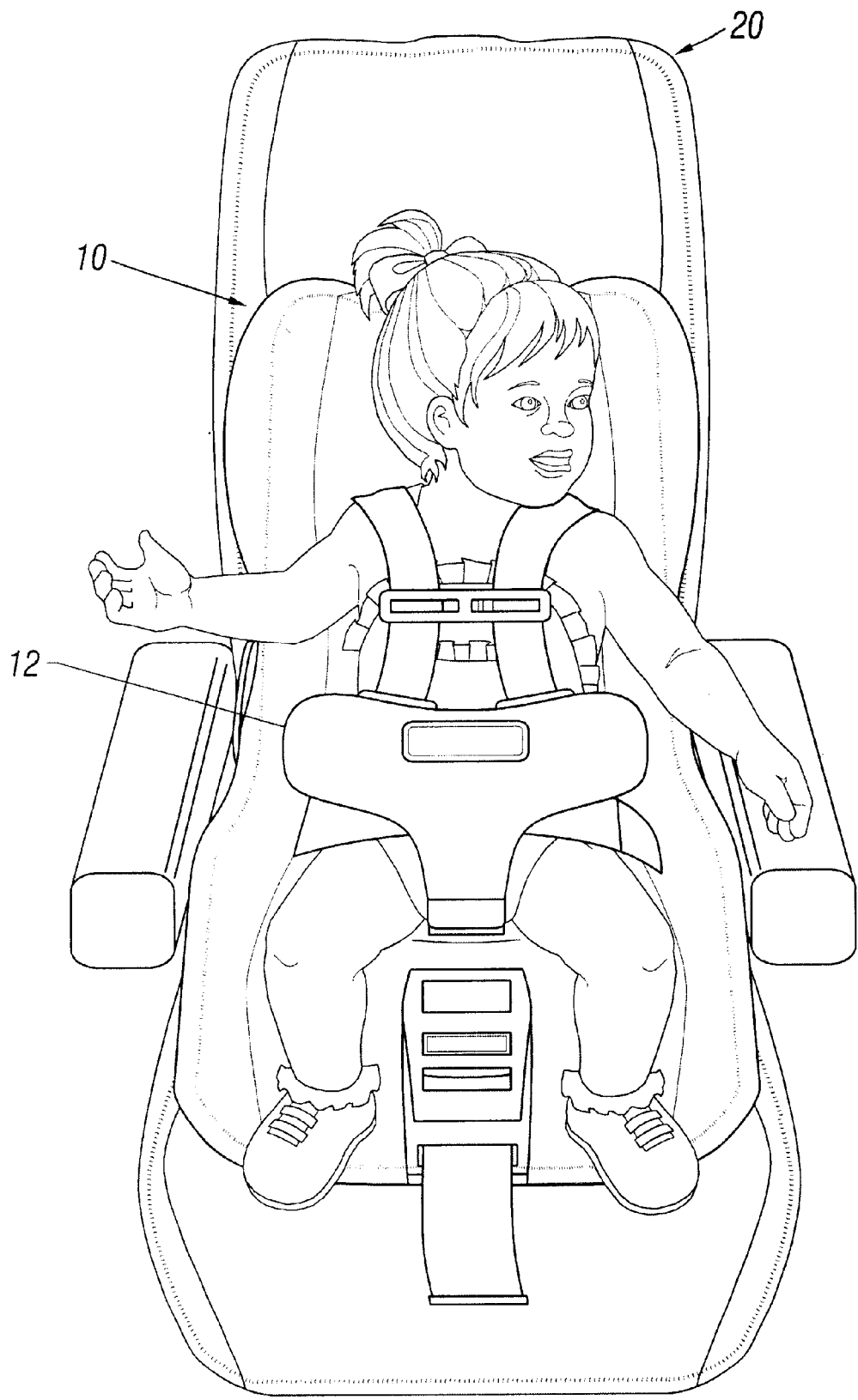
FIG. 1 is a front view of an embodiment of the present disclosures of a commercially available child safety seat secured in an aircraft seat by the present disclosure and a child secured safely within the automotive safety seat.

FIG. 1 is a front view of a typical child safety seat 10, having a harness assembly 12. Safety seat 10 is in a forward facing position, and secured in a commercial aircraft seat 20 by a child restraint system 50 (not visible in this view). A child is secured safely within child safety seat 10.

Figure 2:
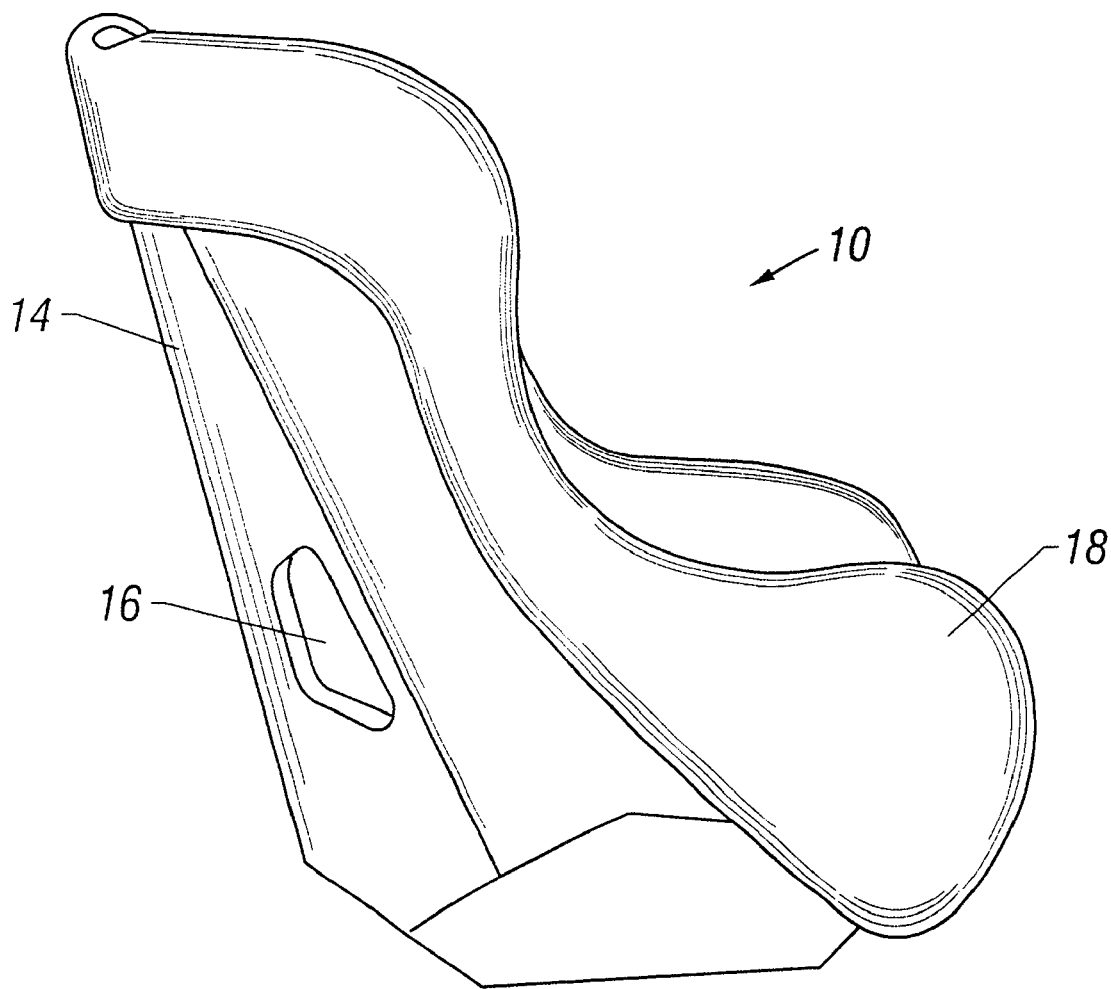
FIG. 2 is a side view of a typical child safety seat.

FIG. 2 is a side view of child safety seat 10. A frame 14 includes a channel 16 for placement of an automotive seat belt (not shown). A cushion 18 covers frame 14 for the comfort and safety of the child. For purposes of use with the disclosed invention, only child safety seats 10 used in a forward facing position and including a harness 12 (not shown) are applicable.

Figure 3:
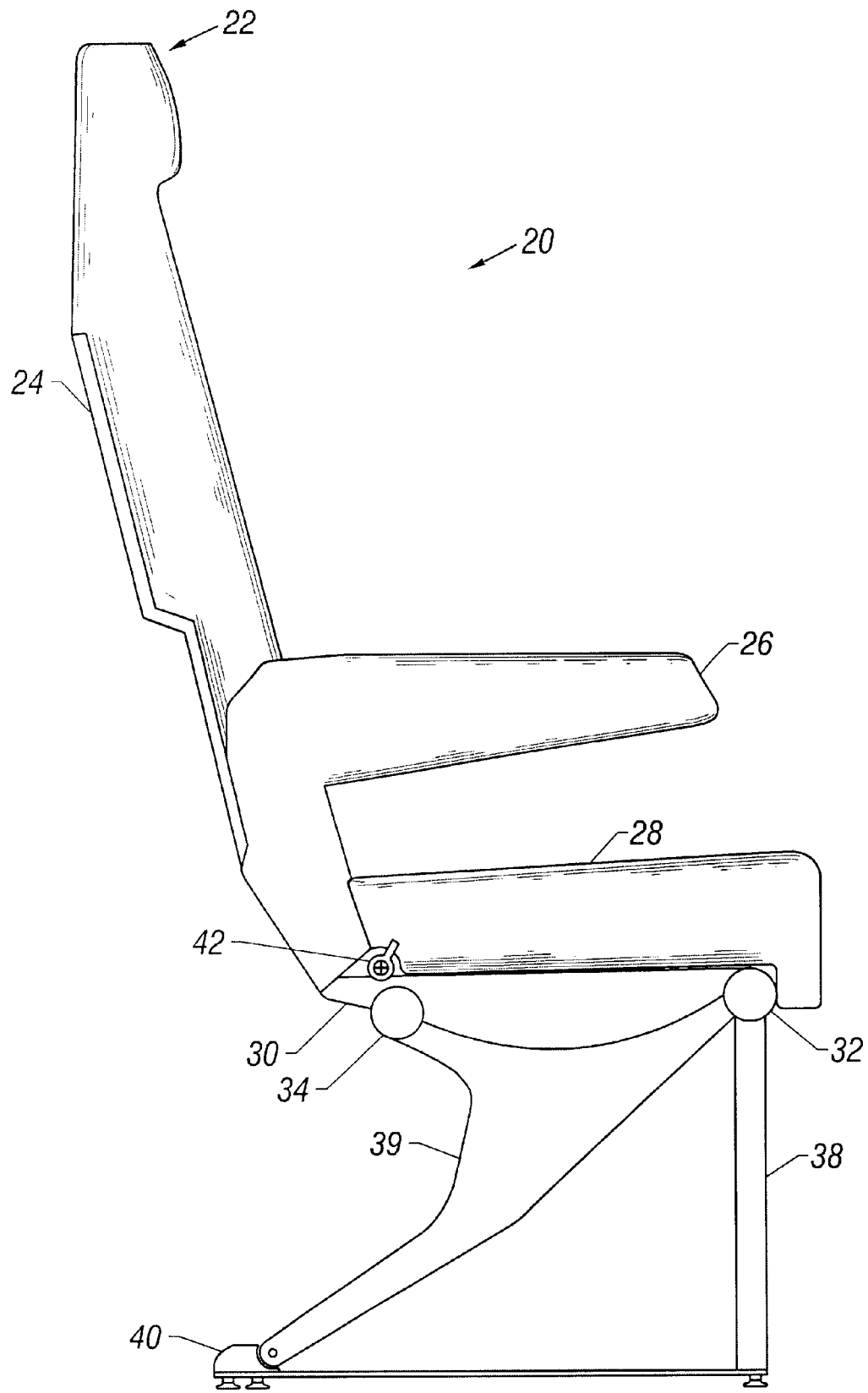
FIG. 3 is a side view of a typical commercial aircraft seat.

FIG. 3 is a side view of a typical commercial aircraft seat 20. Aircraft seat 20 has a seat back 22. A tray table 24 extends from, and retracts into, the rear of seat back 22. A pair of armrests 26 are located generally perpendicular to seat back 22. A seat base 28 rests on a diaphragm 30. Diaphragm 30 is mounted on a front beam 32 and a rear beam 34. Front beam 32 and rear beam 34 are connected by spreader bars 36. Front beam 32 is also attached to a pair of front legs 38. Front beam 32 and rear beam 34 are also attached to a pair of rear legs 39. Front legs 38 and rear legs 39 are attached to seat track fitting 40, which attaches aircraft seat 20 to the floor structure of the fuselage of the airplane. Standard lap belts (not shown) are attached to aircraft seat 20 at an attach shackle 42. It will be understood by a person of ordinary skill in the art that commercial aircraft seats known in the industry comprise numerous variations and additional complications to the above description, but that the above description will suffice for the purpose of understanding the present invention, its application, and its equivalents.

Figure 4:
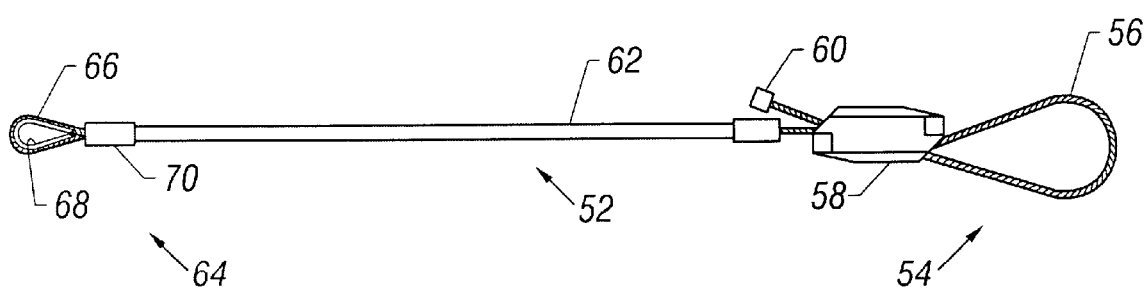
FIG. 4 is a side view of an embodiment of the anchor of the present disclosure.

FIG. 4 is a side view of an anchor 52 of child restraint system 50. In the preferred embodiment of child restraint system 50, a pair of anchors 52 is used. In a preferred embodiment, anchor 52 is made generally of wire rope. In another preferred embodiment, the wire rope is 7×19⅛" stainless steel cable, which is well known in the industry. Anchor 52 has a beam connector 54 at one end. In a preferred embodiment, beam connector 54 is comprised of a loop 56 formed at the end of anchor 52, and a rope grip 58 securing loop 56 to anchor 52. In a preferred embodiment, rope grip 58 is of the commercial available type, such as the Gripple® Model available from Cooper Tools, 1000 Lufkin Rd., Apex, N.C. 27502. In another preferred embodiment, the end of anchor 52 is capped with a stop sleeve 60. Capping anchor 52 with stop sleeve 60 prevents injury to passengers and crewmembers, and damage to anchor 52 and carry-on luggage. In another preferred embodiment, protective shrink-wrap tubing 62 is shrink wrapped on at least a portion of anchor 52. Tubing 62 also prevents injury to passengers and crewmembers, and damage to anchor 52 and carry-on luggage. In a more preferred embodiment, tubing 62 is color-coded in a distinctly visible color, such as red. Color-coding tubing 62 improves visibility for crewmembers looking for an aircraft seat 20 fitted with anchors 52. A belt connector 64 is located on anchor 52 on the end opposite beam connector 54. In a preferred embodiment, belt connector 64 is comprised of a loop 66 formed by anchor 52 around a thimble 68. A loop sleeve 70 secures loop 66 around thimble 68.

Figure 5:
FIG. 5 is a front view of a zip-tie element of an embodiment of the present disclosure.
Figure 6:
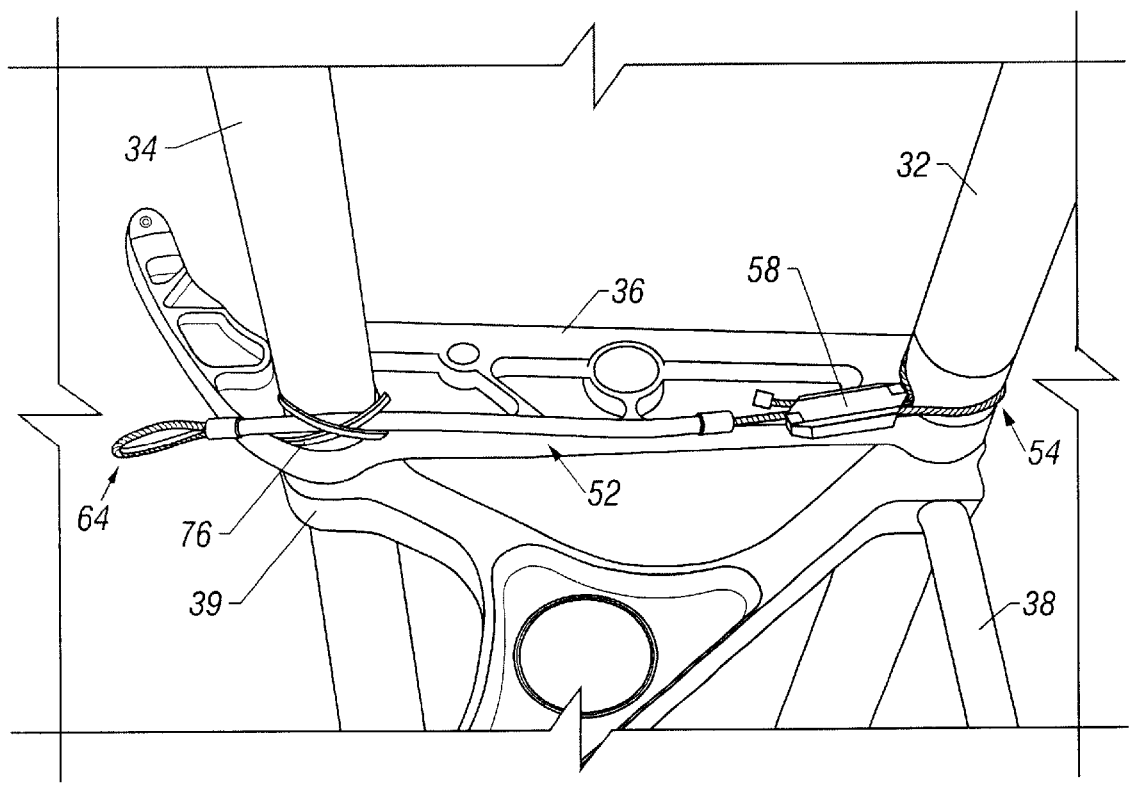
FIG. 6 is an isometric view of an embodiment of the present disclosure, showing the anchor of FIG. 4, and zip-ties of FIG. 5, attached to the lower framework of the commercial aircraft seat of FIG. 3.

FIG. 5 is a front view of a zip-tie 72 of child restraint system 50. In this embodiment, one or more zip-ties 72 are used to secure anchor 52 to rear beam 34 of aircraft seat 20. This can best be seen in FIG. 6. In FIG. 6, beam connector 54 attaches one end of anchor 52 to front beam 32 of aircraft seat 20. Zip-ties 72 secure anchor 52 to rear beam 34 of aircraft seat 20. On the opposite end of anchor 52, belt connector 64 extends past rear beam 34.

Figure 7:
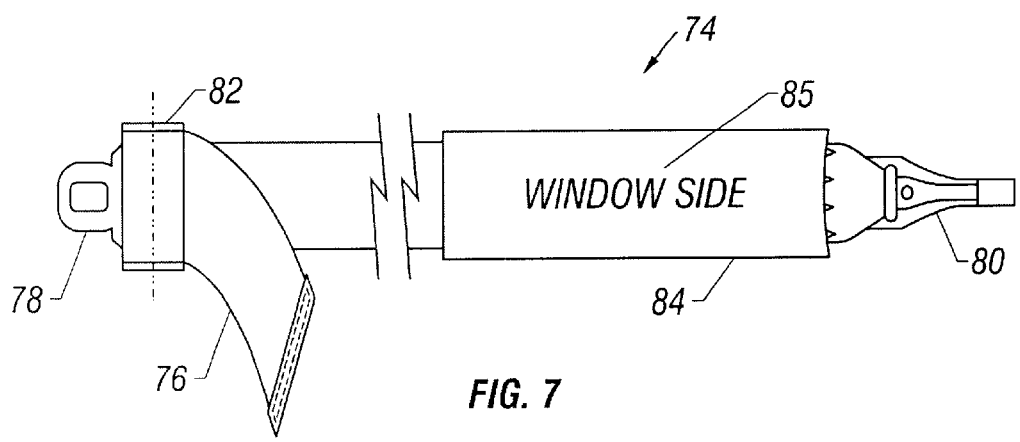
FIG. 7 is a front view of an embodiment of the first belt assembly of the present disclosure.

FIG. 7 is a front view of an embodiment of a first belt assembly 74 of child restraint system 50. In a preferred embodiment, first belt assembly 74 has a first belt 76 made of polyester webbing, such as the type well known to one skilled in the art. A latch plate 78 is attached to one end of first belt 76. A clip 80 is attached to the opposite end of first belt 76. Clip 80 is removably connectable to belt connector 64 of anchor 52. In a preferred embodiment, clip 80 is a snap hook, such as that commercially available and well known to one skilled in the art. In another embodiment, a first belt adjuster 82 adjustably connects latch plate 78 to first belt 76. In another embodiment, a webbing guard 84 is located on first belt 76, between latch plate 78 and clip 80. In another embodiment, a guard mark 85 identifies first belt assembly 74 as being preferably positioned on the "outboard" or "window-side" of an aircraft seat 20. In another embodiment, a guard mark 97 identifies second belt assembly 96 as being preferably positioned on the "inboard" or "aisle-side" of an aircraft seat 20.

Figure 8:
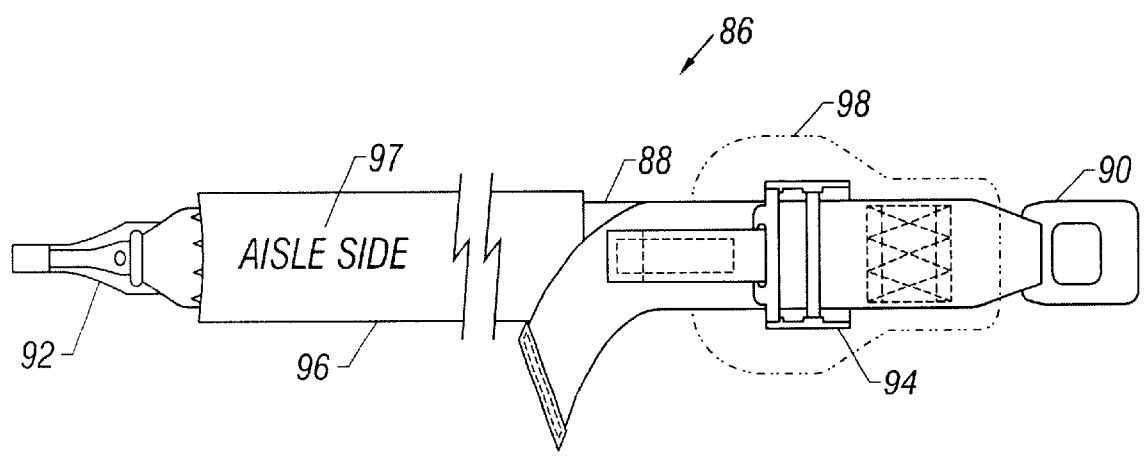
FIG. 8 is a front view of an embodiment of the second belt assembly of the present disclosure.
Figure 9:
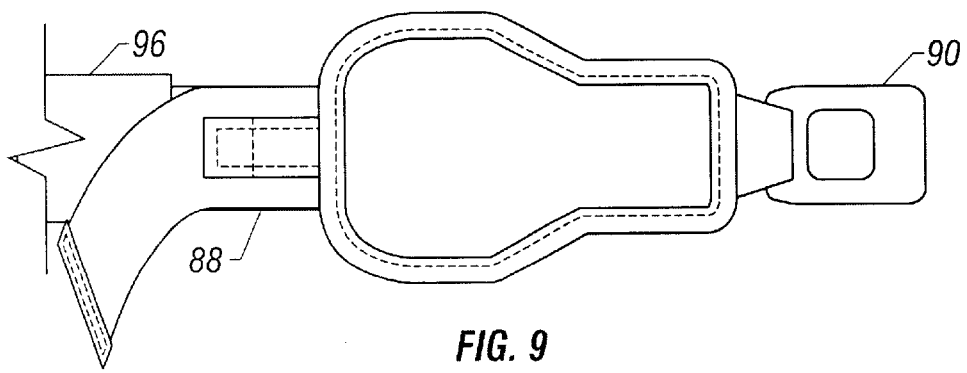
FIG. 9 is a front view of an embodiment of the padding element of the present disclosure.

FIG. 8 is a front view of an embodiment of a second belt assembly 86 of child restraint system 50. In a preferred embodiment, second belt assembly 86 has a second belt 88 made of polyester webbing, such as the type well known to one skilled in the art. A releasable buckle 90 is attached to one end of second belt 88. Buckle 90 is releaseably connectable to latch plate 78 of first belt assembly 74. A clip 92 is attached to the opposite end of second belt 88. Clip 92 is removably connectable to belt connector 64 of anchor 52. In a preferred embodiment, clip 92 is a snap hook, such as the type commercially available and well known to one skilled in the art. A second belt adjuster 94 adjustably connects buckle 90 to second belt 88. In another embodiment, a webbing guard 96 is located on second belt 88, between buckle 90 and clip 92. In another embodiment, a pad 98 is positioned on second belt 88, and located over second belt adjuster 94. This is best seen in FIG. 9.

Figure 10:
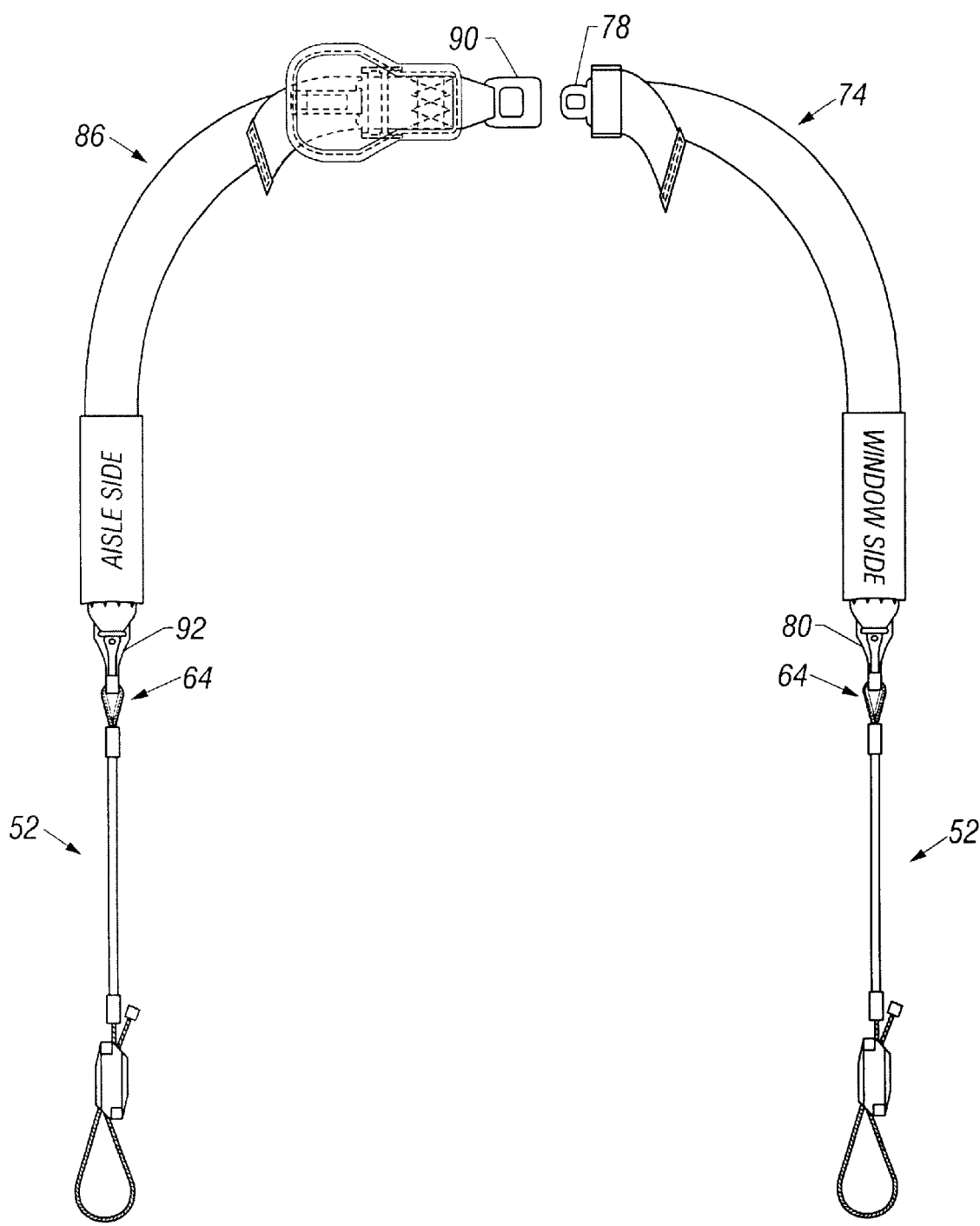
FIG. 10 is a top view of an embodiment of the anchor of the present disclosure, showing the assembled relationship between the anchors and belt assemblies.

FIG. 10 is a top view of an embodiment of child restraint system 50. In this view, the assembled relationship anchors 52, first belt assembly 74 and second belt assembly 86 are shown. As seen in this figure, connection between clip 80 and belt connector 64 removably attaches first belt assembly 74 to an anchor 52. Likewise, connection between clip 92 and belt connector 64 removably attaches second belt assembly 86 to a second anchor 52. Also shown in this figure, connection between buckle 90 and latch plate 78, releasably connects second belt assembly 86 to first belt assembly 74.

In an alternative not shown, but easily understood from the foregoing figures and description, a simple anchor 52 is attached to rear beam 34. In this embodiment, anchor 52 is essentially belt connector 54. This embodiment requires that space permits attachment of anchor 52 on rear beam 34 of the particular aircraft seat 20. This embodiment eliminates the need for any attachment to front beam 32.

Operation of the Invention

Figure 11:
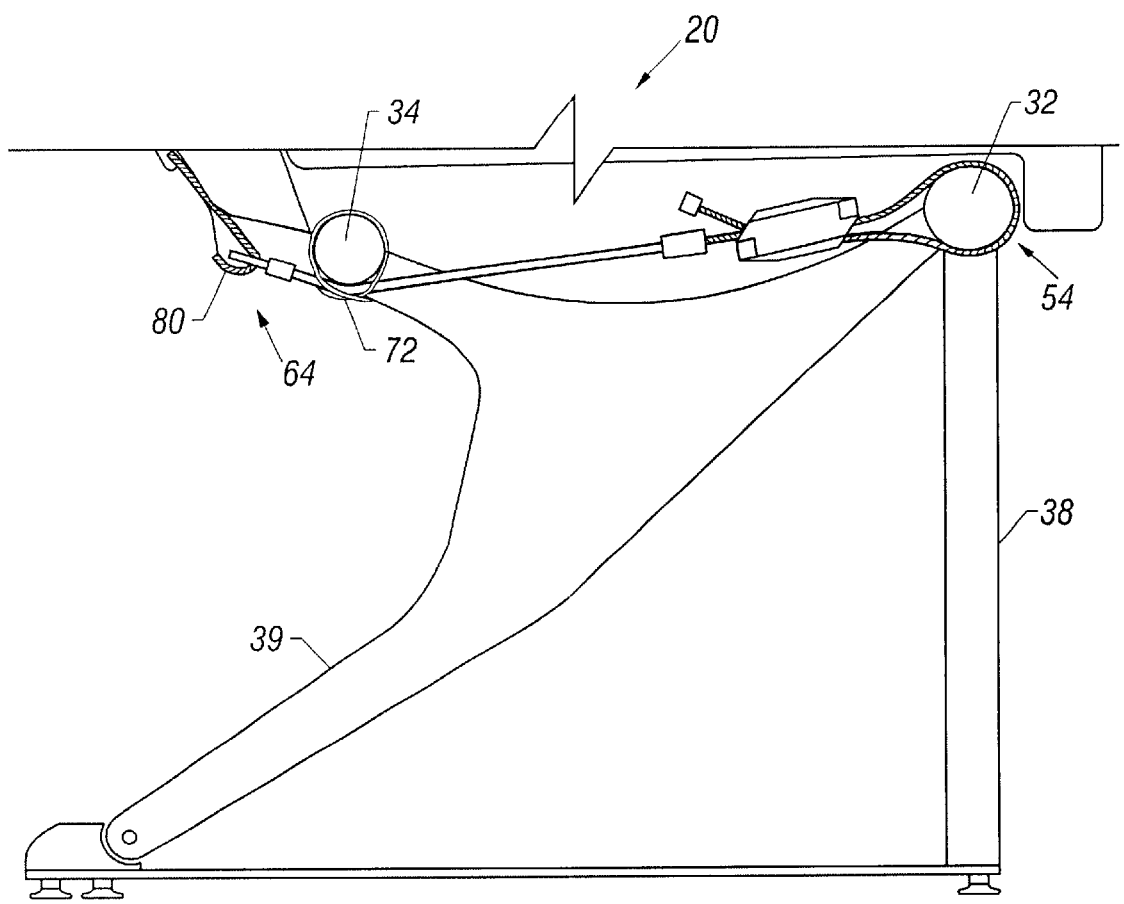
FIG. 11 is a side view of an embodiment of the present disclosure, showing the lower framework of a commercial aircraft seat, showing an anchor attached to the framework as also shown in FIG. 6, and showing the first belt assembly connected to the anchor.
Figure 14:
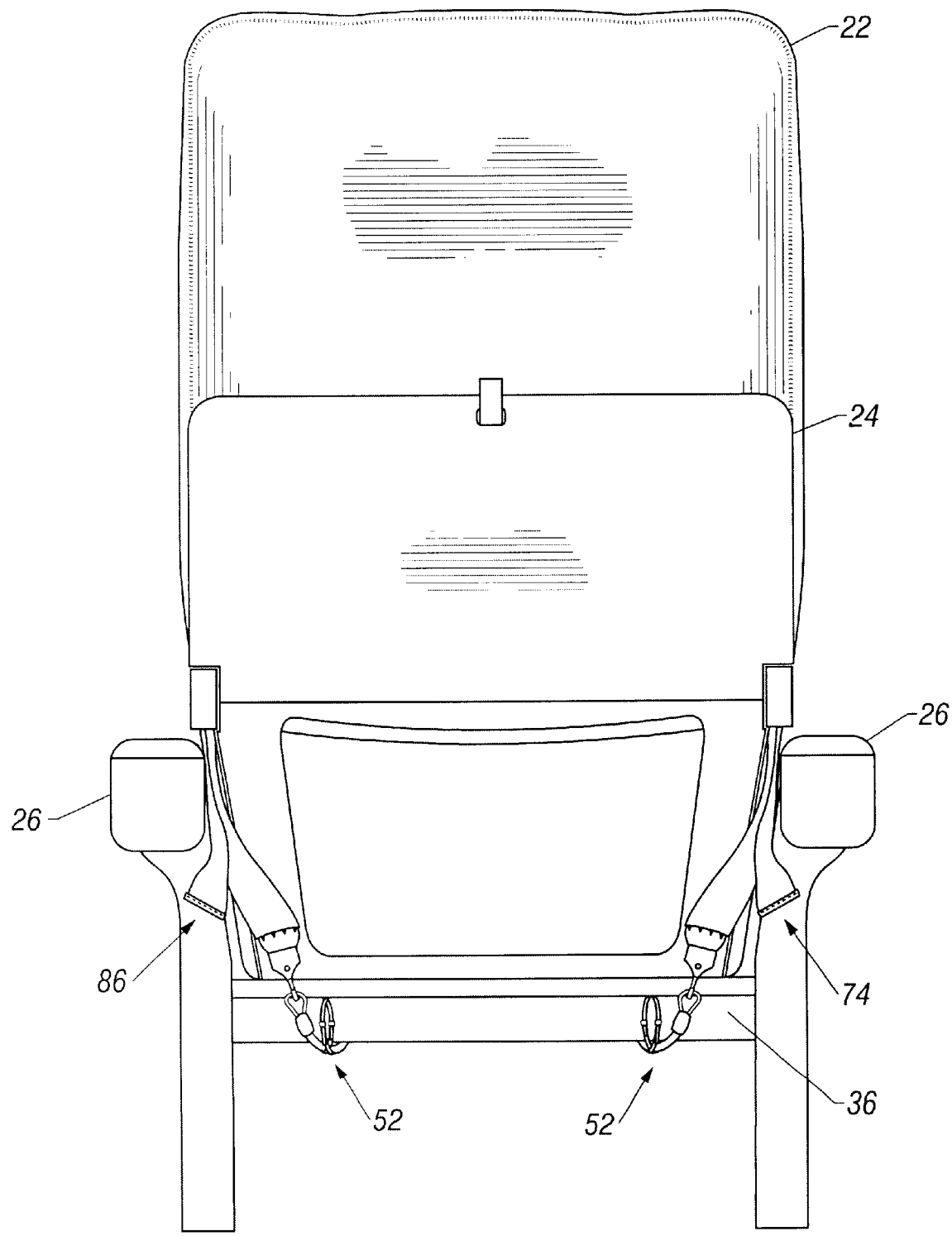
FIG. 14 is a rear view of an embodiment of the present disclosure showing a child safety seat restrained in a commercial aircraft seat with child restraint system of the present disclosure.

In the preferred embodiment of the present invention, anchors 52 are made of wire rope or other suitable material, and have a beam connector 54 at one end. As can best be seen in FIG. 11 and also in FIG. 6, beam connectors 54 are attached to front beam 32 of commercial aircraft seat 20, which has been designated and configured by the air carrier as a seat desirable for children to travel in. Belt connector 64 is located on the opposite end of anchors 52. In a preferred embodiment, anchors 52 are secured to rear beam 34 of seat 20 by zip-ties 72 or other suitable means. In this position, belt connectors 64 of anchors 52 extend past rear beam 34, and are readily locatable and accessible to crewmembers and passengers. Also in this position, anchors 52 will not interfere with evacuations, passenger comfort, tray table use, seat back pocket and safety information card access, or the placement and removal of carry-on luggage under seat 20. These relationships are best seen in FIG. 14. In another embodiment, anchors 52 are color-coded for visibility.

In a preferred embodiment, crewmembers will refer to guard mark 85 of webbing guard 84 to locate first belt assembly 74 on the window-side of aircraft seat 20. Alternatively, or coincident with that identification, crewmembers may refer to guard mark 97 of webbing guard 96 to locate second belt assembly 86 on the aisle-side of aircraft seat 20.

Figure 12:
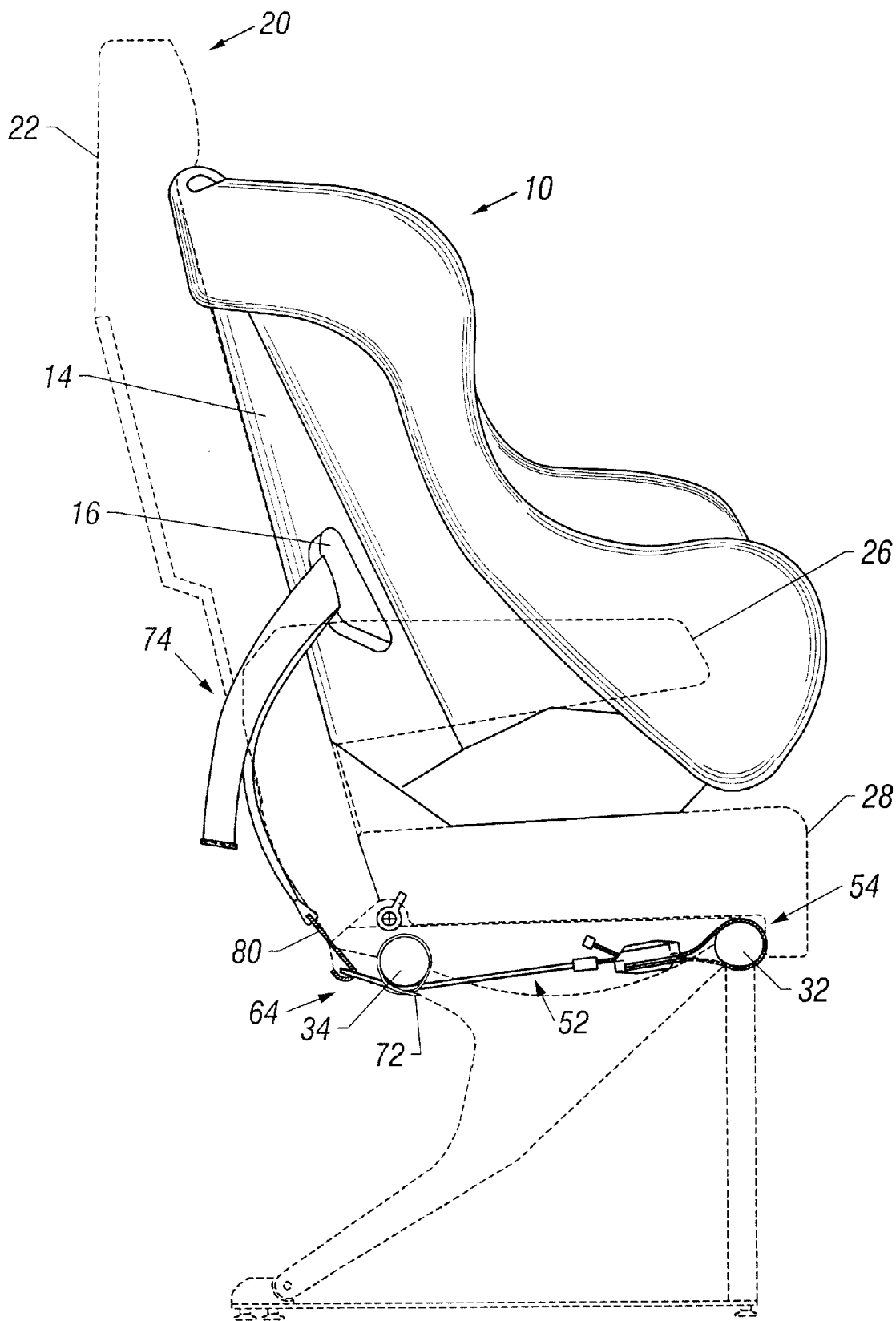
FIG. 12 is a side view of an embodiment of the present disclosure showing a child safety seat restrained in a commercial aircraft seat with the child restraint system of the present disclosure.

As best seen in FIG. 12, a child safety seat 10 is positioned against seat base 28 and seat back 22 of aircraft seat 20. Clip 80 of first belt assembly 74 is attached to belt connector 64 of one anchor 52. Clip 92 of second belt assembly 86 is attached to belt connector 64 of the other anchor 52. Second belt adjuster 94 permits extension of the length of second belt 88 between buckle 90 and clip 92. Likewise, in another embodiment, first belt adjuster 82 permits extension of the length of first belt 76 between latch plate 78 and clip 80.

Figure 13:
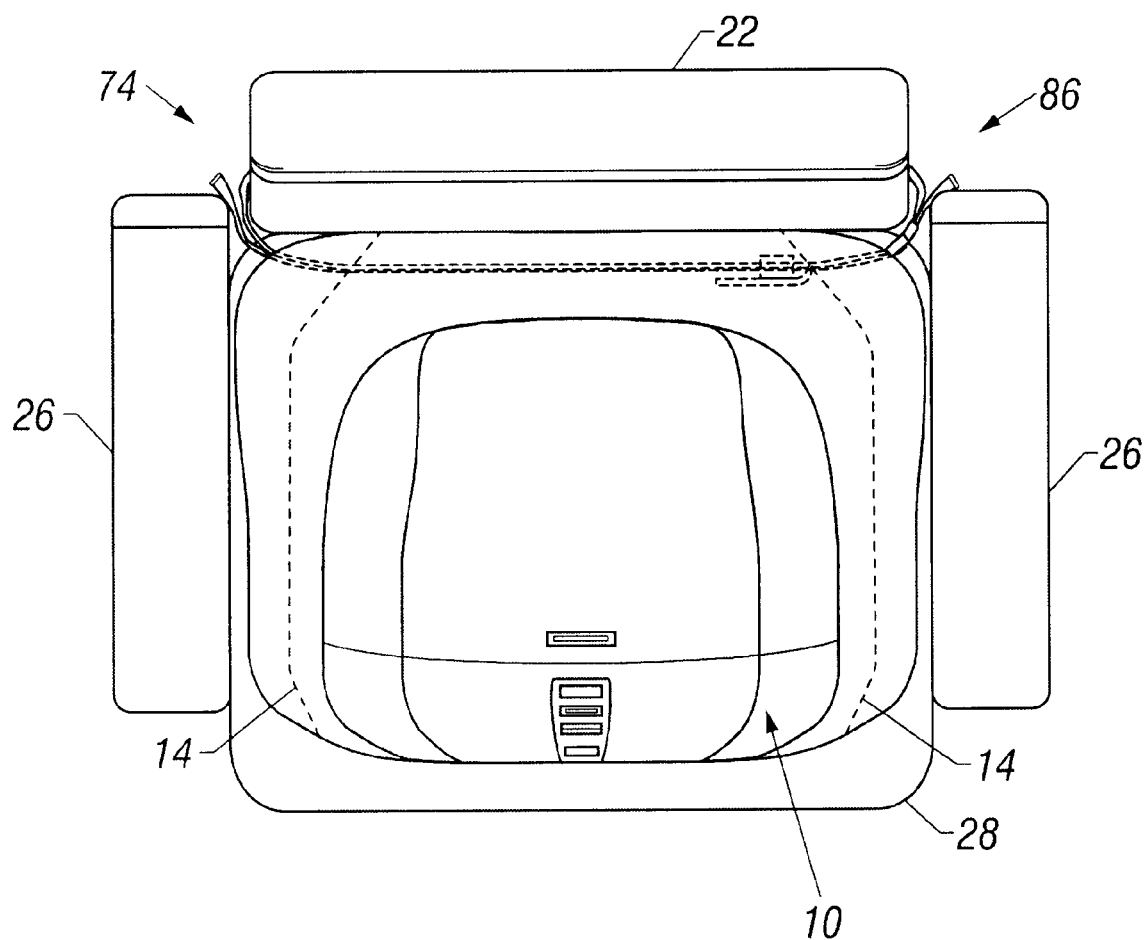
FIG. 13 is a top view of an embodiment of the present disclosure showing a child safety seat restrained in a commercial aircraft seat with child restraint system of the present disclosure.

The length of first belt assembly 74 is adjusted so that latch plate 78 is slightly forward of the front of seat back 22. With the length of second belt assembly 86 fully extended, buckle 90 is passed through channel 16 of frame 14 of child safety seat 10. As seen in FIG. 13, latch plate 78 is then connected to buckle 90 outside of child safety seat 10, preferably on the outboard, or window side. This leaves buckle 90 accessible for easy release of latch plate 78 for removal of car safety seat 10. In FIG. 13, the broken line represents frame 14 of car safety seat 10, showing the clearance to buckle 90 in the assembled position. Referring back to FIG. 12, it can be seen when child restraint system 50 is assembled and connected, first belt assembly 74 and second belt assembly 86 are secured together at one end, and to anchors 52 at the opposite end. Each anchor 52 is attached to either first belt assembly 74 or second belt assembly 86 on one end, and to front beam 32 of seat 20 at the opposite end. When latch plate 78 is connected to buckle 90, the combined length of first belt assembly 74 and second belt assembly 86 can be tensioned by adjustment of second belt adjuster 94. In another embodiment, buckle 90 can always be positioned outside of channel 16 for easy access by coincident adjustment of first belt adjuster 82. The tensioning of the combined length of first belt assembly 74 and second belt assembly 86 secures car seat 10 in place in aircraft seat 20. The child can then be placed into car seat 10 and secured by harness assembly 12. In this configuration, the resultant force acting on connected first belt assembly 74 and second belt assembly 86 during a crash is above the connection of armrest 26 to seat 20, and therefore at an angle closer to the horizon than can be achieved by using standard aircraft seat lap belts attached to attach shackle 42 of aircraft seat 20. This change results in a substantial improvement in the safety of the child traveling by air.

During use, protective shrink-wrap tubing 62 prevents injury to passengers and crewmembers, and damage to anchor 52 and carry-on luggage. In another embodiment, tubing 62 is color-coded in a distinctly visible color, such as red, which improves visibility for crewmembers looking for an aircraft seat 22 fitted with anchors 52. In another embodiment, webbing guard 84 protects first belt 76 and webbing guard 96 protects second belt 88 from damage by contact during installation and use with the various mechanical features of commercial aircraft seat 20, such as seat back pivots, reclining arms, armrest support structures, seat back pocket springs, and the like. Similarly, pad 98 protects buckle 90. Webbing guard 96 may be imprinted to identify the preferred window-side and aisle-side use of first belt assembly 74 and second belt assembly 86.

Upon landing and deplaning, the guardian of the child passenger can release the connection of buckle 90 to latch plate 78 and remove child seat 10. First belt assembly 74 can then be detached from anchor 52 by crewmembers by releasing clip 80. Likewise, second belt assembly 86 can be detached from anchor 52 by crewmembers by releasing clip 92. The pair of anchors 52 can be left in place for convenient use during another flight. First belt assembly 74 and second belt assembly 86 are small, light, and flexible, which permit easy storage onboard the aircraft.

Tests on child restraint system 50 were conducted on Feb. 13, 2001, at the Federal Aviation Administration Civil Aeromedical Institute (CAMI) Biodynamics Research Laboratory in Oklahoma City, Okla. CAMI sled tests were performed with multiple channel acceleration measurements as shown in Table 1 below. Six measured, and two calculated data fields were collected. The acceleration pulse measured in these tests meets the requirements for testing transport category airplane passenger seats as specified in 14 CFR 25.562.

Channel 3 measures Chest X Acceleration. This is the acceleration measured in the X (fore-aft) direction at the center of gravity of the test dummy's chest. This acceleration can be correlated to the potential for internal injuries. The current limit established by the Federal Motor Vehicle Safety Standard in FMVSS §213, is 60 g's.

Calculated Channel 2 is the Head Injury Criteria (HIC). The HIC is calculated from the resultant head acceleration (the vector sum of all three accelerations). The HIC can be correlated to the potential for scull fracture and brain injury. The current limit established in FMVSS §213 is 1000.

Representative test results appear in Table 2, Table 3, and Table 4 below. The test results in each of these tables demonstrate that the tested embodiment of the present invention consistently achieved ratings significantly below the FMVSS §213 limits. These limits cannot be achieved with the use of standard aircraft seat lap belts, on forward facing child safety seats.

TABLE 1

| Channel 1 | Sled Acceleration (g's) | Acceleration measured by an accelerometer mounted on the sled in the direction of sled travel |
| --- | --- | --- |
| Channel 2 | Aux Sled Acceleration (g's) | Acceleration measured by a back up accelerometer |
| Channel 3 | Chest X Acceleration (g's) | Acceleration measured in the X (for-aft) direction at the test dummy's chest center of gravity. |
| Channel 4 | Head X Acceleration (g's) | Acceleration measured in the X (for-aft) direction at the test dummy's head center of gravity. |
| Channel 5 | Head Y Acceleration (g's) | Acceleration measured in the Y (left-right) direction at the test dummy's head center of gravity. |
| Channel 6 | Head Z Acceleration (g's) | Acceleration measured in the Z (up-down) direction at the test dummy's head center of gravity. |
| Calculated Channel 1 | Calculated Velocity | Total velocity change of the sled as derived from the sled accelerometer. |
| Calculated Channel 2 | Calculated HIC | Head Injury Criteria. An injury criteria number calculated from the resultant head acceleration (the vector sum of all three accelerations). |

TABLE 2

| Test: A01005 Date: Feb. 13, 2001 | | | Velocity = 45.06 ft/sec Time = 11:25 AM | | |
| --- | --- | --- | --- | --- | --- |
| Channel | Identifier | Positive Peak | time | Negative Peak | Time |
| 1 | Sled | 2.6 | 0.159 | −18.2 | 0.095 |
| 2 | Aux Sled | 2.7 | 0.159 | −18.1 | 0.095 |
| 3 | Chest X | 7.7 | 0.300 | −35.5 | 0.131 |
| 4 | Head X | 1.5 | 0.071 | −46.8 | 0.141 |
| 5 | Head Y | 5.5 | 0.151 | −4.9 | 0.308 |
| 6 | Head Z | 51.4 | 0.147 | −55.8 | 0.238 |
| Cal 1 | Velocity | 0.0 | .000 | −47.7 | 0.350 |
| Cal 2 | HIC | 482.0 | | | |

TABLE 3

| Test: A01006 Date: Feb. 13, 2001 | | | Velocity = 45.06 ft/sec Time = 2:40 PM | | |
| --- | --- | --- | --- | --- | --- |
| Channel | Identifier | Positive Peak | Time | Negative Peak | Time |
| 1 | Sled | 1.5 | 0.170 | −16.4 | 0.094 |
| 2 | Aux Sled | 1.6 | 0.170 | −16.3 | 0.094 |
| 3 | Chest X | 7.4 | 0.293 | −30.0 | 0.105 |
| 4 | Head X | 9.6 | 0.241 | −34.8 | 0.139 |
| 5 | Head Y | 4.1 | 0.236 | −5.0 | 0.231 |
| 6 | Head Z | 42.5 | 0.135 | −68.2 | 0.232 |
| Cal 1 | Velocity | 0.0 | .002 | −46.5 | 0.350 |
| Cal 2 | HIC | 398.7 | | | |

TABLE 4

| Test: A01007 Date: Feb. 13, 2001 | | | Velocity = 45.06 ft/sec Time = 4:02 PM | | |
| --- | --- | --- | --- | --- | --- |
| Channel | Identifier | Positive Peak | Time | Negative Peak | Time |
| 1 | Sled | 1.0 | 0.169 | −16.5 | 0.098 |
| 2 | Aux Sled | 1.1 | 0.169 | −16.4 | 0.098 |
| 3 | Chest X | 6.6 | 0.294 | −37.6 | 0.116 |
| 4 | Head X | 2.1 | 0.305 | −49.0 | 0.154 |
| 5 | Head Y | 4.5 | 0.181 | −2.2 | 0.301 |
| 6 | Head Z | 76.8 | 0.151 | −30.6 | 0.254 |
| Cal 1 | Velocity | 0.0 | 0.000 | −47.9 | 0.350 |
| Cal 2 | HIC | 518.1 | | | |

From the foregoing, it can be seen conclusively that child restraint system 50 of the present invention provides a significant improvement in the safety of small children flying commercial aircraft, and if used, would improve the probability of survival and reduce the severity of injury for children on aircraft in survivable crashes.

While this invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

All references herein, including as may be found in the claims, to "forward" are suggestive of the direction of the front of the aircraft seat, and not necessarily to the front of the aircraft. All references herein, including as may be found in the claims, to "aft" are suggestive of the direction of the rear of the aircraft seat, and not necessarily to the rear of the aircraft. All references herein, including as may be found in the claims, to "inboard" are suggestive of the aisle side of the aircraft seat. All references herein, including as may be found in the claims, to "outboard" are suggestive of the window side of the aircraft seat.

We claim:

1. An aircraft child restraint system comprising:

a pair of anchors, each anchor having a beam connector on one end and a belt connector on the opposite end; the beam connector being connectable to the forward seat beam of an aircraft seat;

a first belt assembly having a belt with a latch plate on one end, and a clip on the opposite end;

a second belt assembly having a belt with a releasable buckle on one end, a clip on the opposite end, and a length adjustment assembly located between the buckle and clip; and, wherein each clip is removably connectable to the belt connector of the anchors and the latch plate is quick-connectable to the buckle.

2. An aircraft child restraint system in accordance with claim 1, further comprising:
   a zip-tie for securing the anchors to the rear seat beam of the aircraft seat.

3. An aircraft child restraint system in accordance with claim 1, further comprising:
   a first belt adjuster movably connecting the latch plate to the belt of either the first or second belt assembly.

4. An aircraft child restraint system in accordance with claim 1, wherein the first and second belt assemblies are constructed of polyester webbing.

5. An aircraft child restraint system in accordance with claim 1, further comprising:
   a webbing guard located on at least one belt assembly.

6. An aircraft child restraint system in accordance with claim 5, further comprising:
   a guard mark on the webbing guard indicating that the belt assembly is preferred for window-side placement.

7. An aircraft child restraint system in accordance with claim 5, further comprising:
   a guard mark on the webbing guard indicating that the belt assembly is preferred for aisle-side placement.

8. An aircraft child restraint system in accordance with claim 1, further comprising:
   an adjuster pad is located on the second belt assembly.

9. An aircraft child restraint system in accordance with claim 1, wherein at least one anchor is made of wire rope.

10. An aircraft child restraint system in accordance with claim 9, wherein the wire rope is 7×19⅛" stainless steel cable.

11. An aircraft child restraint system in accordance with claim 9, wherein at least one beam connector further comprises:
    a loop formed at the end of the wire rope; and,
    a rope grip for securing the loop.

12. An aircraft child restraint system in accordance with claim 11, wherein at least one beam connector further comprises:
    a stop sleeve capped onto the wire rope portion that exits the rope grip.

13. An aircraft child restraint system in accordance with claim 9, further comprising:
    a protective shrink-wrap tubing located on at least a portion of the wire rope.

14. An aircraft child restraint system in accordance with claim 13, wherein the shrink-wrap tubing is color-coded in a distinctly visible color.

15. An aircraft child restraint system in accordance with claim 9, wherein the belt connector further comprises:
    a thimble located at the end of the wire rope;
    a loop formed by the wire rope around the thimble; and,
    a loop sleeve securing the loop around the thimble.

16. An aircraft child restraint system in accordance with claim 9, wherein the clip further comprises:
    a snap hook attached to the either the first or second belt assembly.

17. A method for installing and storing the aircraft restraint system of claim 1, comprising the steps of:
    1) connecting each anchor to the forward seat beam of the aircraft seat;
    2) attaching the anchors to the rear beam of the aircraft seat; and,
    3) storing the first belt assembly and the second belt assembly on board the aircraft for use when needed.

18. A method for installing the aircraft restraint system of claim 1 to an aircraft seat, comprising the steps of:
    1) connecting each anchor to the forward seat beam of the aircraft seat;
    2) connecting the first belt assembly to one anchor; and,
    3) connecting the second belt assembly to the other anchor.

19. An aircraft child restraint system comprising:
    a first belt assembly having a latch plate on one end and a beam connector on the opposite end;
    a second belt assembly having a releasable buckle on one end, a beam connector on the opposite end, and a second belt adjuster located between the buckle and the beam connector; and,
    wherein each beam connector is removably connectable to the forward seat beam of an aircraft seat, and the latch plate is quick-connectable to the buckle.

20. An aircraft child restraint system in accordance with claim 19, further comprising:
    a first belt adjuster movably connecting the latch plate to the belt.

21. An aircraft child restraint system in accordance with claim 19, further comprising:
    a zip-tie for securing a belt assembly to the rear seat beam of the aircraft seat.

22. An aircraft child restraint system in accordance with claim 19, wherein the first and second belt assemblies are primarily constructed of polyester webbing.

23. An aircraft child restraint system in accordance with claim 19, further comprising:
    a webbing guard located on at least one belt assembly.

24. An aircraft child restraint system in accordance with claim 23, further comprising:
    a guard mark on the webbing guard indicating that that belt assembly having the webbing guard is preferred for window-side placement.

25. The method for installing an aircraft restraint system for children to an aircraft seat, of claim 24, further comprising the steps of:
    attaching the anchors to the rear beam of the aircraft seat with zip-ties.

26. An aircraft child restraint system in accordance with claim 23, further comprising:
    a guard mark on the webbing guard indicating that that belt assembly having the webbing guard is preferred for aisle-side placement.

27. An aircraft child restraint system in accordance with claim 19, further comprising:
    an adjuster padding located on the second belt assembly.

28. A method for securing a child safety seat in an aircraft seat comprising the steps of:
    1) connecting a pair of anchors to the forward seat beam of the aircraft seat;
    2) placing a child safety seat on the aircraft seat;
    3) connecting a first belt assembly having a latch plate to one anchor;
    4) connecting a second belt assembly having a releasable buckle and a second belt adjuster to the other anchor;
    5) connecting the latch plate of first belt assembly to the releasable buckle of the second belt assembly through the child safety seat frame; and,
    6) tensioning the connected belt assemblies by adjusting their connected length.

29. A method for securing a child safety seat in an aircraft seat comprising the steps of:

1) connecting a pair of anchors to the forward seat beam of the aircraft seat;
2) placing a child safety seat having a seat harness on the aircraft seat;
3) connecting a first belt assembly having a latch plate to one anchor;
4) connecting a second belt assembly having a releasable buckle and a second belt adjuster to the other anchor;
5) connecting the latch plate of first belt assembly to the releasable buckle of the second belt assembly through the child safety seat frame;
6) tensioning the connected belt assemblies by adjusting their connected length;
7) placing a child into the child safety seat; and,
8) properly securing the seat harness over the child.

* * * * *